United States Patent [19]

Spicer

[11] Patent Number: 5,224,641
[45] Date of Patent: Jul. 6, 1993

[54] AIR BEARING FOR TAPE DRIVE

[75] Inventor: Barry K. Spicer, Berthoud, Colo.

[73] Assignee: Storage Technology Corporation, Louisville, Colo.

[21] Appl. No.: 794,423

[22] Filed: Nov. 19, 1991

Related U.S. Application Data

[63] Continuation of Ser. No. 571,753, Aug. 23, 1990, abandoned.

[51] Int. Cl.$^5$ .......................................... B65H 20/14
[52] U.S. Cl. ..................................... 226/97; 226/196; 242/76
[58] Field of Search .................... 226/7, 97, 194, 196; 242/76; 384/100

[56] References Cited

U.S. PATENT DOCUMENTS

| | | | |
|---|---|---|---|
| 3,279,091 | 10/1966 | Freuler | 226/97 |
| 3,602,412 | 8/1971 | Altonji et al. | 226/97 |
| 3,620,430 | 11/1971 | Baumann et al. | 226/97 |
| 3,746,233 | 7/1973 | Bauer | 226/194 |
| 3,753,517 | 8/1973 | Takenaka et al. | 226/196 X |
| 3,986,651 | 10/1976 | Grant | 226/95 |
| 4,093,148 | 6/1978 | Urynowicz et al. | 242/182 |
| 4,474,320 | 10/1984 | Rueger | 226/97 |
| 4,673,514 | 6/1987 | Casey et al. | 210/783 |
| 4,779,150 | 10/1988 | Grant | 360/85 |
| 4,842,177 | 6/1989 | Callender et al. | 226/97 |
| 4,848,633 | 7/1989 | Hagen et al. | 226/97 |

OTHER PUBLICATIONS

Hetherington, J. C., "A Self-Aligning System for Maintaining Alignment of Webs Between Vacuum Drums," *Western Electric Tech. Dig.*, No. 31, Jul., 1973.

Streeter, D. N., "Web Guide," *IBM Tech. Disclosure Bulletin*, vol. 4, No. 9, Feb., 1962.

*IBM Technical Disclosure Bulletin*, vol. 27, No. 7B, "Tape Guide Design," Andresen et al., Dec. 1984.

*IBM Technical Disclosure Bulletin*, vol. 15, No. 8, "Continuous Compliant Tape Guide", Griffiths, Jan. 1973.

*Primary Examiner*—Daniel P. Stodola
*Assistant Examiner*—Paul T. Bowen
*Attorney, Agent, or Firm*—Duft, Graziano & Forest

[57] ABSTRACT

The flanges on either side of the arcuate path of the tape support are juxtaposed thereto in an abutting relationship so that there is a substantially continuous solid surface extending from flange to flange to provide support for the magnetic tape transported thereon. A plurality of air supply holes are provided in this arcuate surface to provide the air flow necessary to implement an air bearing. The air from the air bearing is vented through a plurality of slots provided in the surface of the arcuate surface in predefined locations thereon. The use of the plurality of slots provides controllable variability of the air flow in the air bearing and also provides a substantially solid surface on which the tape is transported.

4 Claims, 2 Drawing Sheets

AIR BEARING FOR TAPE DRIVE

This is a continuation of application Ser. No. 07/571,753, filed Aug. 23, 1990 now abandoned.

FIELD OF THE INVENTION

This invention relates to magnetic tape data storage subsystems and, in particular, to an improved air bearing for the tape transport path in a magnetic tape drive.

PROBLEM

It is a problem in the field of magnetic tape data storage subsystems to provide a tape path that accurately guides the magnetic tape over the read/write heads in precision alignment therewith yet provides a low friction path to reduce wear on the magnetic tape. The prior art air bearing apparatus includes a number of configurations, all of which function to provide a flow of air between the magnetic tape and the underlying surface of the tape path. One such arrangement is illustrated in U.S. Pat. No. 4,842,177 issued Jun. 27, 1989 to B. L. Callender, et al. which discloses a semicircular-shaped tape support with an integral air bearing. The tape travels along the arcuate surface of the semicircular-shaped tape support on an air bearing. A port in this arcuate surface senses the air pressure between the tape and the arcuate surface. Flanges are provided on the ends of the tape support to guide the tape over the air bearing and also to provide a vent for the air bearing to prevent vibration of the tape thereon. The air bearing vent surface consists of a gap between the arcuate surface and the flanges on either side thereof and along the entire length of the arcuate surface to enable the air from the air bearing to vent uniformly around the arcuate surface. The air is supplied from an air source through the arcuate surface via a plurality of holes provided therein. The difficulty with such an arrangement is that a gap of substantial size appears between the arcuate surface and the flanges on both sides thereof. This gap prevents the flanges from providing an effective guiding function to center the tape within the tape path since the tape edges have a tendency to enter the gap between the arcuate surface and the flanges. This arrangement also provides no control over the air flow since the gap between the arcuate surface and the flanges extends along the entire length of the tape path thereby minimizing the possibility of variably controlling the air flow in the air bearing along the length of the tape path.

SOLUTION

The above described problems are solved and a technical advance achieved in the field by the air bearing for a magnetic tape drive which provides a plurality of slots in the arcuate surface of the tape support in predefined locations. These slots controllably regulate the air flow in the air bearing and also provide a substantially solid surface for the tape along the entire length of the tape support and from flange to flange. In the preferred embodiment disclosed herein, the flanges on either side of the arcuate shaped tape support are juxtaposed thereto in an abutting relationship so that there is a substantially continuous solid surface extending from flange to flange to provide support for the magnetic tape transported thereon. A plurality of air supply holes are provided in this arcuate surface to provide the air flow necessary to implement an air bearing. The air from the air bearing is vented through a plurality of slots provided in the surface of the arcuate shaped tape support in predefined locations thereon. The use of the plurality of slots provides controllable variability of the air flow in the air bearing and also provides a substantially solid surface on which the tape is transported. The air vent slots are preferably located along the periphery of the arcuate surface adjacent to the flanges attached thereto. Such an arrangement provides a positive air flow from the center of the arcuate surface to the periphery thereof to provide a uniform air bearing across the entire dimension of the arcuate surface yet also enabling the flanges to provide the edge guide function to controllably regulate the position of the magnetic tape along the tape transport path. Due to the fact that the magnetic tape comes in contact with the flanges, the flanges must be manufactured of a resilient material, such as ceramic, thereby rendering the slot location in the periphery of the arcuate path a preferred location due to simplicity of machining, even though these slots could be located in an adjoining location on the flanges themselves.

DETAILED DESCRIPTION

Data processing systems have traditionally utilized magnetic tape as a data storage medium. Typically, the magnetic tape is wound and rewound between supply and takeup reels in a tape drive. The magnetic tape is guided past a read-write head by bearings which provide an interface of forced air with the magnetic tape to lower friction forces between the tape and bearing surface and which permit rapid acceleration and deceleration of the magnetic tape. Since information is stored on the magnetic tape in a very dense format, it is necessary that the position of the magnetic tape in the tape path be accurately controlled so as to provide accurate data writing and reading.

Three functions that a tape drive must provide are: sensing tension in the tape; buffering or decoupling the tape at the magnetic head from any perturbations arising at the reels; and, reliably guiding the tape along the tape path. In conventional tape drives, a separate station is required to accomplish each of these three functions. That is, a first apparatus senses tape tension, a second apparatus decouples the tape at the head from any perturbations arising at the reels, and a third apparatus guides the tape along the tape path.

Figure 1:
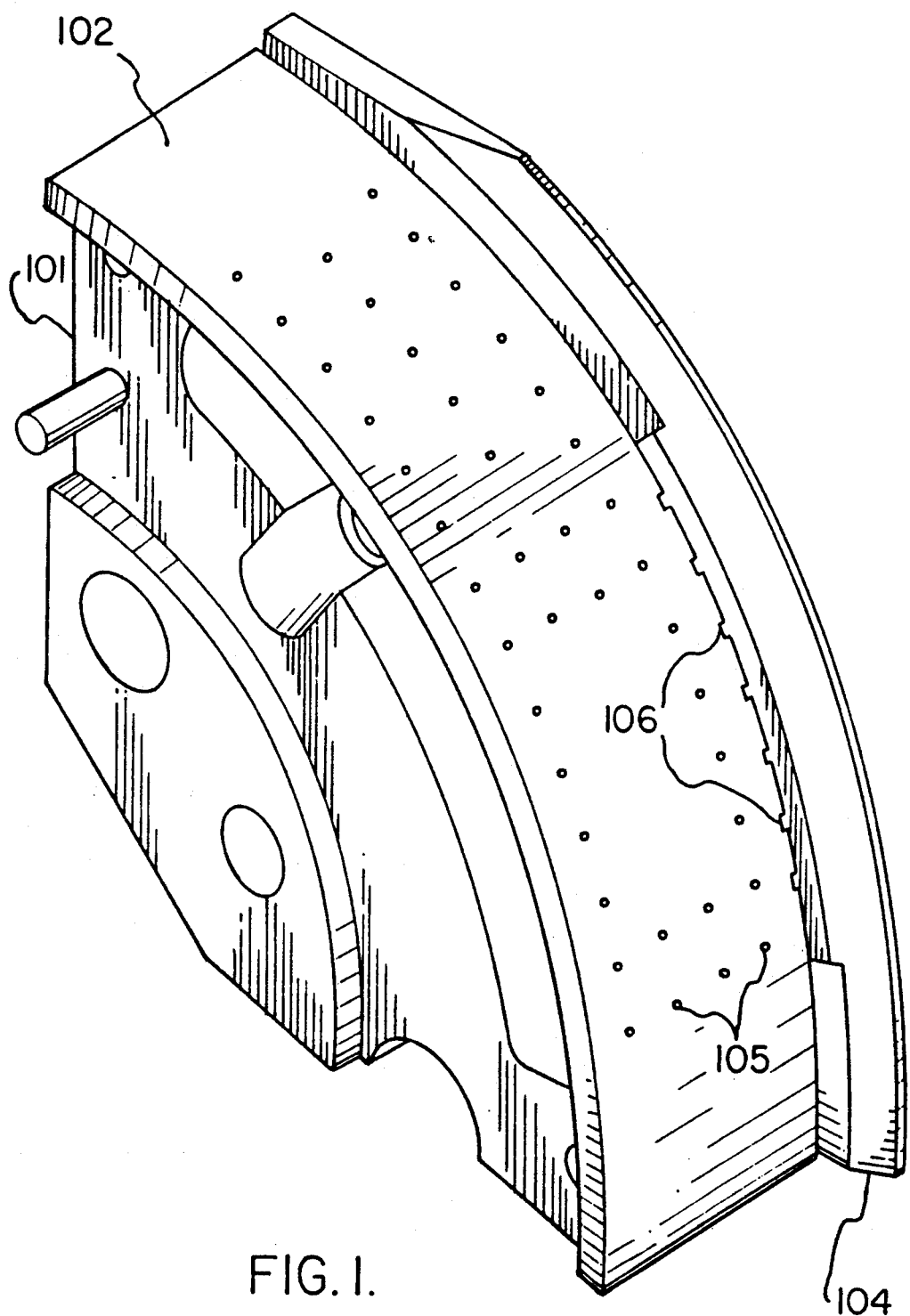
FIG. 1 illustrates a perspective view of the air bearing apparatus of the present invention.
Figure 3:
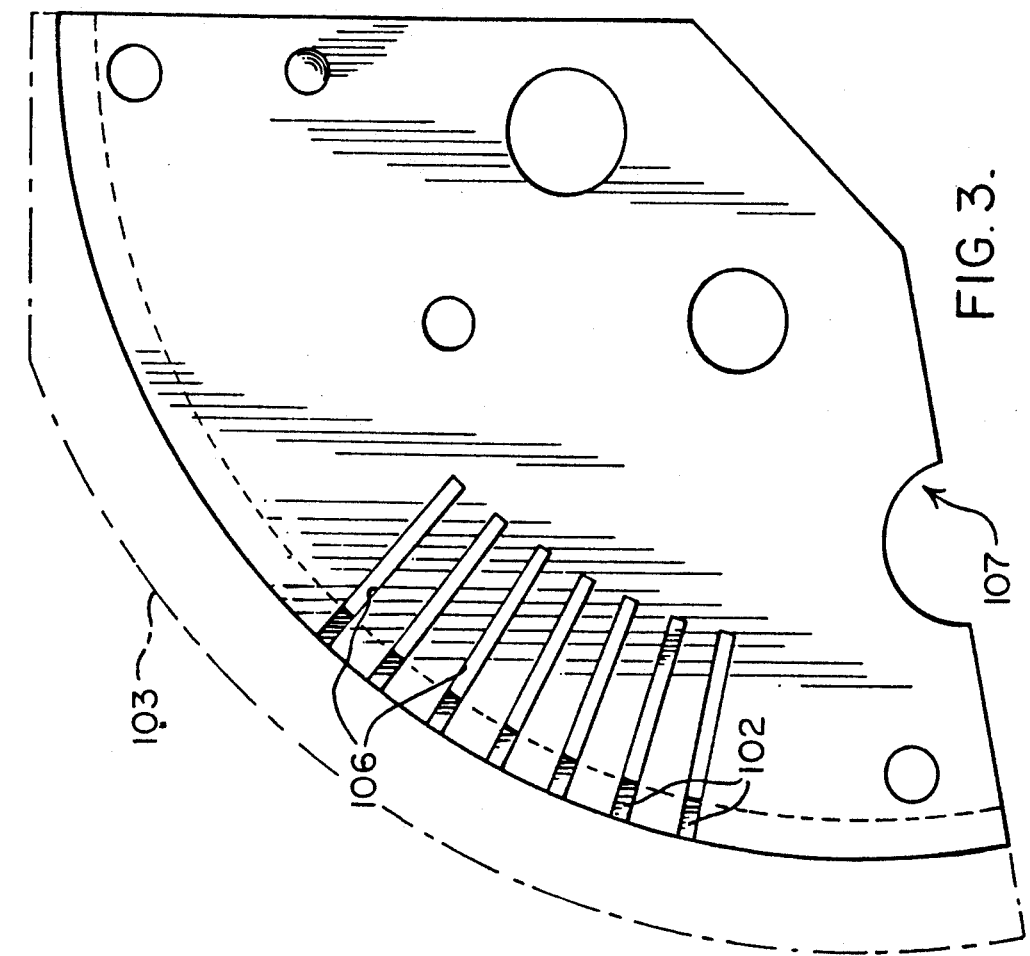
FIG. 3 illustrates a cross sectional view of the air bearing apparatus of the present invention.
Figure 2:
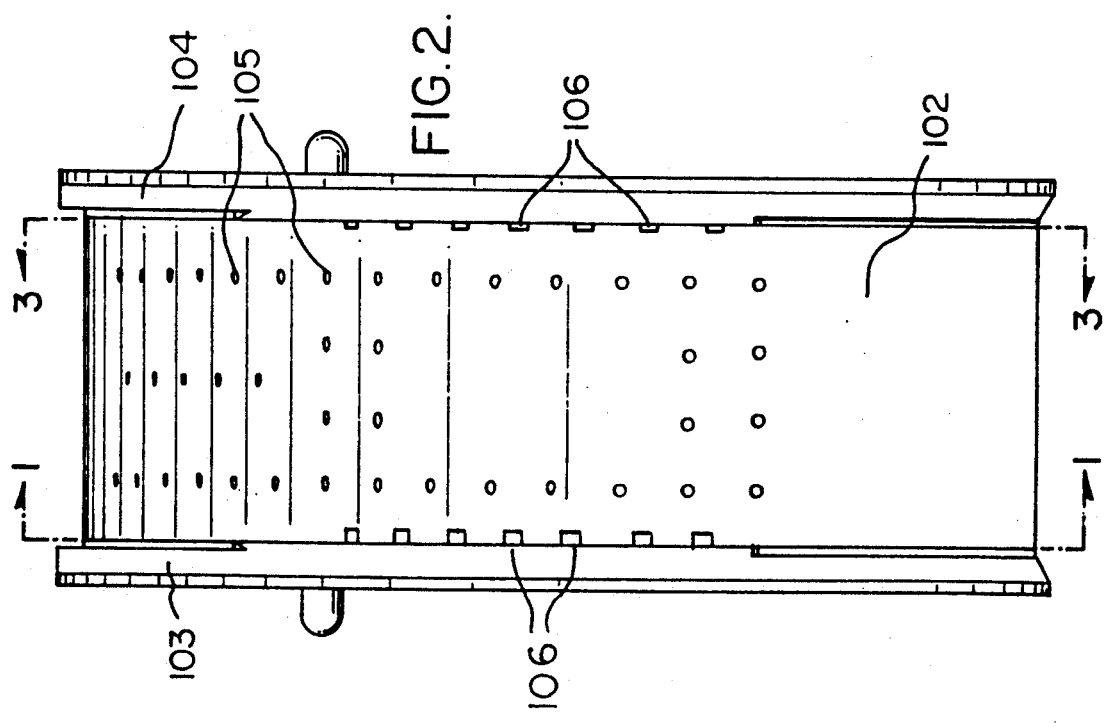
FIG. 2 illustrates a top view of the air bearing apparatus of the present invention.

FIGS. 1-3 illustrate perspective, top and side views of the air bearing apparatus of the present invention for guiding the tape along the tape path. This apparatus consists of a tape support 101 having an arcuate or cylindrical shaped surface 102, on either side of which is attached a flange 103, 104 to form a channel in which the magnetic tape in transported. In order to prevent the magnetic tape from wearing on the arcuate surface 102, an air bearing is provided thereon to cause the magnetic tape to ride on a cushion of air as it is transported across the arcuate surface 102. The corresponding flanges 103, 104 are of a size and shape to guide the magnetic tape within the channel formed by the arcuate surface 102 of the tape support 101 and the two flanges 103, 104. A plurality of air supply holes 105 are provided in the arcuate surface 102 located according to a predefined pattern thereon in order to supply the air under pressure that comprises the air bearing itself. The creation of such an air bearing surface is well known in the art and is not detailed herein. A source of air under pressure (not shown) provides a positive flow through these air supply holes 105 in the arcuate surface 102 to provide a cushion of air on which the magnetic tape travels.

This positive air flow must be vented from underneath the magnetic tape in order to prevent fluttering of the edge of the tape as the positive air flow vents from under the magnetic tape along the flanges 103, 104 to the ambient surroundings. In order to provide this venting function, a plurality of slots 106 are provided along the periphery of the arcuate surface 102 where the arcuate surface 102 comes into contact with the flanges 103, 104 in order to thereby provide an air flow from the center of the magnetic tape outward to the flanges 103, 104 and venting therefrom without causing magnetic tape edge flutter. The specific size, shape and location of these slots in the arcuate surface 102 can be selected to vary the air flow along the length of the arcuate surface 102 of the tape support 101 to thereby provide a customized air flow or air pressure profile. In the preferred embodiment disclosed herein, the slots 106 are machined into the edge of arcuate surface 102 and radial support 107 to thereby not only provide the desired openings in arcuate surface 102 of tape support 101 but also provide an unobstructed channel to vent the pressurized air from the air bearing to the ambient atmosphere. Due to the fact that the magnetic tape comes in contact with the flanges, the flanges must be manufactured of a resilient material, such as ceramic, thereby rendering the slot location in the periphery of the arcuate path a preferred location due to simplicity of machining, even though these slots could be located in an adjoining location on the flanges themselves.

The plurality of slots 106 (at least four slots and preferably more) are in contrast with the single slot extending along the entire length of the tape support as was used in the prior art. The slots 106 are of dimensions such that the length of each slot 106 measured along the flange 103, 104 is only a small fraction of the length of the tape support 102. This small extent of each slot 106 thereby presents a substantially solid tape support arcuate surface 102 to the magnetic tape while providing a vent to the pressurized air of the air bearing. In addition, by varying the number, location and spacing between slots 106, a customized air flow within the air bearing can be implemented. This enables the creation of a varying air pressure gradient in the air bearing along the length of arcuate surface 102. The slots 106 can be located along one or both of flanges 103, 104 and can include slots located away from flanges 103, 104 yet in the arcuate surface 102.

While a specific embodiment of this invention has been disclosed, it is expected that those skilled in the art can and will design alternate embodiments of this invention that fall within the scope of the appended claims.

I claim:

1. In a tape drive, an air bearing apparatus for controllably providing a cushion, formed of a gaseous medium, on which a magnetic tape travels, comprising:

a tape support having a substantially continuous arcuate surface over which said magnetic tape travels, said tape support arcuate surface having top and bottom edges, and said arcuate surface being divided into three regions, a first being located along said top edge, a second being located along said bottom edge, and a third being located between said first and second regions and having a first air flow channel comprising a plurality of apertures in said third region of said arcuate surface through which said gaseous medium can be supplied under pressure for supporting said magnetic tape on a gaseous cushion;

first and second flanges affixed to said top and bottom edges of said arcuate surface, respectively, each providing a substantially continuous surface which contacts an edge of said magnetic tape for guiding said magnetic tape therebetween and along said arcuate surface wherein said first and second flanges are both affixed to said top and bottom edges of said arcuate surface, respectively, absent an interstice therebetween; and said first and second regions each having a second air flow channels comprising at least two elongated slots in said arcuate surface to form a vent to permit said gaseous medium to controllably escape from under said magnetic tape in a manner to avoid tape edge flutter, wherein said elongated slots are located lengthwise circumferentially along each of said top and bottom edges of said arcuate surface and spaced a predetermined distance apart to provide a uniform controlled flow of said gaseous medium from said plurality of apertures in said third region to said top and bottom edges in said first and second regions of said arcuate surface.

2. The apparatus of claim 1 wherein said first and second flanges abut said arcuate surface to form a substantially solid surface with said arcuate surface from said first flange to said second flange.

3. The apparatus of claim 1 wherein said tape support arcuate surface is of a width to match the width of said magnetic tape so that said magnetic tape extends from said first flange to said second flange across said arcuate surface.

4. In a tape drive, an air bearing apparatus for controllably providing a cushion, formed of a gaseous medium, on which a magnetic tape travels, comprising:

a tape support having a substantially continuous arcuate surface over which said magnetic tape travels, said arcuate surface having top and bottom edges, and said arcuate surface being divided into three regions, a first being located along said top edge, a second being located along said bottom edge, and a third being located between said first and second regions and having a plurality of apertures in said third region of said arcuate surface through which said gaseous medium can be supplied under pressure for supporting said magnetic tape on a gaseous cushion wherein said arcuate surface is of a width to match the width of said magnetic tape so that said magnetic tape extends from said first top edge to said bottom edge across said arcuate surface;

first and second flanges affixed to said top and bottom edges of said arcuate surface, each providing a substantially continuous surface which contacts an edge of said magnetic tape respectively, for guiding said magnetic tape therebetween and along said arcuate surface wherein said first and second flanges are both affixed to said top and bottom edges of said arcuate surface, respectively, absent an interstice therebetween; and said first and second regions each having a plurality of elongated slots in said arcuate surface to form a vent to permit said gaseous medium to controllably escape from under said magnetic tape, in a manner to avoid tape edge flutter, wherein said elongated slots are located in said first and second regions lengthwise circumferentially along said top and bottom edges of said arcuate surface and spaced a predetermined distance apart to provide a controlled flow of said gaseous medium from said plurality of apertures in said third region to said top and bottom edges in said first and second regions of said arcuate surface.

* * * * *